United States Patent
Szoucsek

(10) Patent No.: US 9,879,826 B2
(45) Date of Patent: Jan. 30, 2018

(54) METHOD FOR PRODUCING A TANK, IN PARTICULAR A MOTOR VEHICLE TANK

(71) Applicant: Bayerische Motoren Werke Aktiengesellschaft, Munich (DE)

(72) Inventor: Klaus Szoucsek, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 257 days.

(21) Appl. No.: 14/688,269

(22) Filed: Apr. 16, 2015

(65) Prior Publication Data

US 2015/0300571 A1 Oct. 22, 2015

(30) Foreign Application Priority Data

Apr. 16, 2014 (DE) .................. 10 2014 207 300

(51) Int. Cl.
*B65B 31/04* (2006.01)
*F17C 3/08* (2006.01)
*F17C 3/04* (2006.01)

(52) U.S. Cl.
CPC .............. *F17C 3/08* (2013.01); *F17C 3/04* (2013.01); *F17C 2203/014* (2013.01); *F17C 2203/0304* (2013.01); *F17C 2203/0391* (2013.01); *F17C 2203/0629* (2013.01); *F17C 2221/012* (2013.01); *F17C 2221/033* (2013.01); *F17C 2223/0115* (2013.01); *F17C 2223/0161* (2013.01); *F17C 2223/033* (2013.01); *F17C 2227/0306* (2013.01); *F17C 2227/0309* (2013.01); *F17C 2227/0372* (2013.01); *F17C 2227/0374* (2013.01); *F17C 2227/045* (2013.01); *F17C 2260/033* (2013.01); *F17C 2265/065* (2013.01); *F17C 2270/0168* (2013.01); *Y02E 60/321* (2013.01)

(58) Field of Classification Search
CPC .............. F17C 2227/03–2227/0313; F17C 2223/0146–2223/0161; F17C 3/08; F27B 2014/045; F27B 14/00; F28D 20/0034
USPC .............. 220/560.12, 581–592; 141/82
See application file for complete search history.

(56) References Cited

U.S. PATENT DOCUMENTS

| | | | | |
|---|---|---|---|---|
| 872,795 A * | 12/1907 | Burger | ............... | B65D 1/0215 215/12.2 |
| 1,056,971 A * | 3/1913 | Coleman | ............... | H01J 9/40 215/12.2 |
| 1,335,544 A * | 3/1920 | Anders | ............... | C03B 23/13 65/34 |
| 1,387,337 A * | 8/1921 | Anders | ............... | C03B 23/13 65/34 |
| 2,513,749 A * | 7/1950 | Schilling | ............... | F16L 59/06 220/560.09 |
| 2,643,022 A * | 6/1953 | Cornell | ............... | A47J 41/02 165/904 |
| 2,722,336 A * | 11/1955 | Wexler | ............... | A47J 41/028 114/74 A |
| 2,729,357 A * | 1/1956 | Nason, Jr. | ............... | A47J 41/028 114/74 A |
| 2,823,822 A * | 2/1958 | Altman | ............... | F17C 13/086 114/74 A |
| 2,863,297 A * | 12/1958 | Johnston | ............... | F17C 3/08 114/74 A |
| 2,922,287 A * | 1/1960 | Rae | ............... | F17C 3/10 220/560.12 |
| 3,007,596 A * | 11/1961 | Matsch | ............... | A47J 41/022 156/62.2 |
| 3,097,084 A * | 7/1963 | Putman | ............... | F17C 3/08 220/560.13 |
| 3,108,706 A * | 10/1963 | Matsch | ............... | F17C 3/08 220/592.11 |
| 3,114,469 A * | 12/1963 | Francis | ............... | F17C 3/08 220/592.27 |
| 3,122,000 A * | 2/1964 | Sirocky | ............... | F17C 9/00 220/560.1 |
| 3,130,561 A * | 4/1964 | Hnilicka, Jr. | ............... | C23C 14/20 165/96 |
| 3,232,732 A * | 2/1966 | Wax | ............... | A47J 41/024 65/34 |
| 3,347,056 A * | 10/1967 | Lester | ............... | B64G 1/402 220/560.09 |
| 3,423,817 A * | 1/1969 | Bobo | ............... | B29D 22/003 29/422 |
| 3,514,006 A * | 5/1970 | Molnar | ............... | F17C 3/08 220/560.1 |

(Continued)

FOREIGN PATENT DOCUMENTS

DE 693 04 701 T2 1/1997
EP 1 546 601 B1 8/2007

OTHER PUBLICATIONS

German Search Report issued in counterpart German Application No. 10 2014 207 300.6 dated Sep. 6, 2016, with partial English translation (ten (10) pages).

*Primary Examiner* — Paul R Durand
*Assistant Examiner* — Randall Gruby
(74) *Attorney, Agent, or Firm* — Crowell & Morning LLP

(57) ABSTRACT

A method is provided for producing a tank, in particular a motor vehicle tank, for storing a fuel in a low-temperature state. The tank has an inner tank receiving the fuel, an outer skin surrounding the inner tank and an insulating layer arranged between the inner tank and the outer skin. The method i) introduces fuel into the inner tank, a temperature of 30° C. to 120° C., preferably of 70° C. to 85° C., being obtained by the fuel in the inner tank, and ii) generates negative pressure in an insulating layer arranged between the inner tank and the outer skin.

11 Claims, 1 Drawing Sheet

(56) References Cited

U.S. PATENT DOCUMENTS

| | | | |
|---|---|---|---|
| 3,550,251 A * | 12/1970 | Goto | C03B 23/13 215/12.1 |
| 3,698,588 A * | 10/1972 | Pogorski | B65D 81/3811 220/592.26 |
| 3,930,375 A * | 1/1976 | Hofmann | F17C 3/10 220/560.12 |
| 3,942,331 A * | 3/1976 | Newman, Jr. | F17C 3/02 220/560.08 |
| 4,220,462 A * | 9/1980 | Frazier | C03B 23/18 228/19 |
| 4,251,252 A * | 2/1981 | Frazier | A47J 41/022 228/221 |
| 4,399,919 A * | 8/1983 | Posnansky | A47J 41/005 126/674 |
| 4,471,206 A * | 9/1984 | Nagai | A47J 41/028 219/121.14 |
| 4,496,073 A * | 1/1985 | Silver | F17C 13/086 220/560.11 |
| 4,997,124 A * | 3/1991 | Kitabatake | F16L 59/065 220/592.21 |
| 5,153,977 A * | 10/1992 | Toida | B23K 1/001 228/176 |
| 5,165,569 A * | 11/1992 | Furuhashi | B65D 7/045 220/4.04 |
| 5,408,832 A * | 4/1995 | Boffito | F16L 59/065 428/69 |
| 5,765,379 A * | 6/1998 | Jensen | F25D 23/062 312/401 |
| 6,648,168 B2 * | 11/2003 | Fujii | A47J 41/02 220/592.21 |
| 6,708,502 B1 * | 3/2004 | Aceves | F17C 3/08 220/560.08 |
| 7,743,940 B2 * | 6/2010 | Brunnhofer | F17C 1/06 220/4.13 |
| 8,408,246 B2 * | 4/2013 | Adams | B01D 19/0005 137/563 |
| 8,807,382 B1 * | 8/2014 | Haberbusch | F17C 13/001 220/560.04 |
| 9,038,855 B2 * | 5/2015 | Lurcott | B01F 3/0861 141/10 |
| 9,057,483 B2 * | 6/2015 | Espinosa-Loza | F17C 13/00 |
| 9,494,282 B2 * | 11/2016 | Kampitsch | F17C 3/04 |
| 2003/0029877 A1 * | 2/2003 | Mathur | F17C 3/02 220/592.27 |
| 2004/0011796 A1 * | 1/2004 | Baba | A47J 41/0077 220/592.2 |
| 2004/0250551 A1 * | 12/2004 | Schnagl | F17C 3/00 62/45.1 |
| 2008/0237244 A1 * | 10/2008 | Tsukahara | F01P 11/029 220/592.27 |
| 2009/0090725 A1 * | 4/2009 | Ravex | F17C 3/08 220/560.12 |
| 2010/0146992 A1 * | 6/2010 | Miller | F17C 3/04 62/47.1 |
| 2010/0236259 A1 * | 9/2010 | Brunner | F17C 1/00 62/48.1 |
| 2011/0302933 A1 * | 12/2011 | Immel | F17C 11/005 62/51.1 |
| 2015/0007584 A1 * | 1/2015 | Brunner | F17C 7/00 62/48.1 |
| 2015/0028039 A1 * | 1/2015 | Kircher | F17C 3/02 220/592.27 |
| 2015/0072260 A1 * | 3/2015 | Brunner | F17C 13/005 429/436 |
| 2015/0158657 A1 * | 6/2015 | Olson | B65D 81/3841 220/592.27 |
| 2015/0219279 A1 * | 8/2015 | Pelger | F17C 5/06 141/4 |
| 2015/0330576 A1 * | 11/2015 | Zhai | F17C 3/08 220/560.12 |
| 2016/0053942 A1 * | 2/2016 | Rebernik | F17C 3/02 220/592.2 |

* cited by examiner

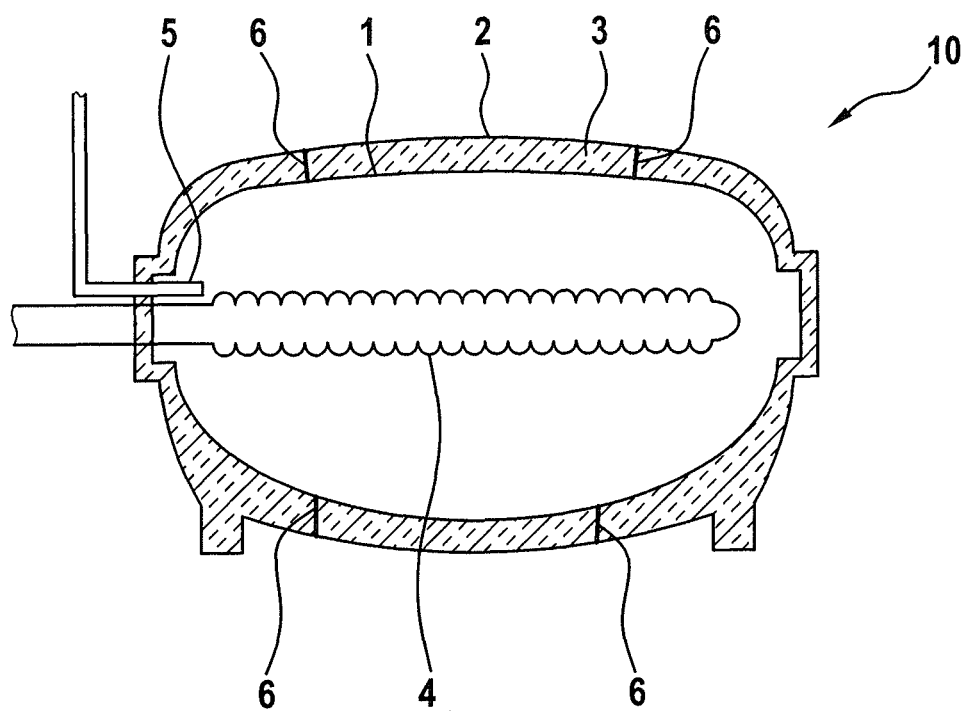

METHOD FOR PRODUCING A TANK, IN PARTICULAR A MOTOR VEHICLE TANK

CROSS REFERENCE TO RELATED APPLICATION

This application claims priority under 35 U.S.C. §119 from German Patent Application No. 10 2014 207 300.6, filed Apr. 16, 2014, the entire disclosure of which is herein expressly incorporated by reference.

BACKGROUND AND SUMMARY OF THE INVENTION

The present invention relates to an accelerated method for producing a tank, in particular a motor vehicle tank, for storing fuel in a low-temperature state.

Fuels in a low-temperature state are increasingly used nowadays as an energy source for driving vehicles or motor vehicles. EP 1 546 601 A1 describes a pressure container for the mobile and reversible storage of cryogenic vehicle fuels. The pressure container includes an inner container for receiving a cryogenic vehicle fuel and an outer container which surrounds the inner container. Between the inner container and the outer container there is a vacuum which serves for thermally insulating the cryogenic vehicle fuel stored in the inner container. The vacuum here is generated in an evacuation process lasting over a number of days, wherein the outer tank has to be kept at temperatures of approximately 100-120° C. by an external heat source. This requires a high technical, energy and time outlay and therefore causes high costs for the manufacturing of the pressure container.

Starting from this prior art, it is the object of the present invention to provide a method for producing a tank for storing fuel in a low-temperature state, which method can be carried out in an energy-efficient manner and can be used cost-effectively without a high time and technical outlay.

This and other objects are achieved by a method for producing a tank for storing a fuel in a low-temperature state, comprising an inner tank receiving the fuel, an outer skin surrounding the inner tank and an insulating layer arranged between the inner tank and the outer skin. The method according to the invention includes the following steps: i) introducing fuel into the inner tank, a temperature of 30° C. to 120° C., preferably of 70° to 85° C., being obtained by the fuel in the inner tank, and ii) generating a negative pressure in an insulating layer arranged between the inner tank and the outer skin. Examples which can be mentioned as possible fuels include liquid hydrogen, cryogenic hydrogen in the supercritical state, liquid natural gas and other liquefied or low-temperature gases which are stored, in particular, as an energy source for driving a vehicle or a motor vehicle.

The method according to the invention makes it possible to dispense with the technically complicated use of external heating apparatuses for heating the outer skin in order to generate negative pressure and in order to produce a vacuum. The heating temperature for the evacuation operation in the insulating layer is applied by the fuel introduced into the inner tank. The wall of the inner tank is also heated by the temperature obtained in the inner tank. Heat is then transmitted to the adjacent insulating layer via the wall. This operation of transmitting heat from the inside outward is substantially more energy efficient than a transmission of heat by means of a heated outer container since, firstly, the inner tank is not exposed to any external environmental factors influencing the temperature. Secondly, the increasing reduction in pressure in the insulating layer brings about an increasingly better thermal insulation of the inner tank, as a result of which the temperature in the inner tank can be maintained for a longer period, without the use of further energy, or only drops very slowly, which accelerates the evacuation process and promotes the energy efficiency thereof.

According to an advantageous development, a temperature of 30° C. to 120° C., preferably of 70° C. to 85° C., is obtained in the inner tank by the fuel being preheated before being introduced into the inner tank. In other words, this involves hot filling which improves the production process. The hot fuel can be consumed following the evacuation process and new low-temperature fuel can be filled into the inner tank.

As an alternative thereto, optionally also in combination therewith, the temperature of 30° to 120° C., preferably of 70° C. to 85° C. is obtained by the fuel being heated in the inner tank. This can take place, for example, by way of a heat exchanger provided in the inner tank.

In order to provide very good thermal insulation of a fuel when the tank produced according to the invention is used, the negative pressure is preferably generated in such a manner that an absolute pressure in the insulation layer is $10^{-3}$ mbar to $10^{-5}$ mbar.

Further advantageously, a temperature of the fuel upon introduction into the inner tank is 0° C. to 70° C., preferably 20° C. to 50° C. Fuels which are customarily used can be handled very readily within the stated temperature ranges. Owing to the compressibility of said fuels, when the fuel is filled into the inner tank, a sufficient heating temperature of at least 30° C., and preferably of at least 70° C. to at maximum 85° C., can consequently be very easily obtained.

In order to accelerate the evacuation process, the negative pressure is preferably generated by way of a vacuum pump, in particular by a turbomolecular pump.

The method is furthermore advantageously developed in such a manner that: i) the generating of negative pressure, or ii) the introducing of the heated fuel and the generating of negative pressure, are carried out in a mobile manner, preferably in a vehicle tank or motor vehicle tank arranged on a vehicle, in particular a motor vehicle. This permits location-independent production of the tank, as a result of which the manufacturing time of a vehicle or motor vehicle with the tank produced according to the invention can be kept short at the factory.

By the method according to the invention being carried out within the context of a first filling of the tank, further manufacturing time can be saved. In addition, the fuel introduced into the inner tank for the evacuation process can be immediately used for generating energy.

The method according to the invention is furthermore advantageously suitable for producing a cryo pressure tank which is designed for receiving hydrogen in a supercritical state as the fuel.

On the basis of the solutions according to the invention and the developments thereof, the following advantages are afforded:

1) the method is highly energy efficient and can therefore be used cost-effectively;

2) the method can be carried out independently of location, 3) manufacturing times required at the factory are reduced by the method, and 4) the method can be used without a high technical outlay.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic illustration of a tank produced according to an embodiment of the invention.

DETAILED DESCRIPTION OF THE DRAWING

The present invention is explained in detail with reference to an exemplary embodiment. Only the aspects of the invention that are of interest here are illustrated in FIG. 1; all of the other elements are omitted for the sake of clarity.

In detail, FIG. 1 shows a tank 10 which can be provided, for example, as what is referred to as a cryo pressure tank for storing hydrogen in the supercritical state. The tank 10 has an inner tank 1 which serves for receiving and storing a fuel. The inner tank 1 is designed to be pressure-resistant and is surrounded by an outer skin 2, wherein the inner tank 1 is supported against the outer skin 2 by way of suspension structures 6. An insulating layer which can be evacuated by the method according to the invention is arranged between the inner tank 1 and the outer skin 2. The inner tank 1 is fillable with a low-temperature fuel via a filling and removal line 5. The inner tank 1 furthermore has a heat exchanger 4 which, during the subsequent use of the tank 10, ensures reliable removal of fuel from the inner tank 1.

When the method according to the invention is used, fuel is filled into the inner tank 1 via the filling and removal line 5, and a temperature of 30° C. to 120° C., preferably of 70° C. to 85° C., is achieved by the fuel in the inner tank 1. For this purpose, a fuel which is already preheated can be used. Alternatively or optionally also in addition thereto, the fuel can be heated, for example by use of the heat exchanger 4, after being filled into the inner tank 1. The maximum pressure permissible in the inner tank 1 and a permissible maximum temperature are taken into consideration in the filling operation. If a preheated fuel is used, the latter preferably has a temperature of 0° C. to 70° C., in particular of 20° C. to 50° C. By fuel flowing into the inner tank 1 during the filling operation, the fuel is compressed, and therefore further heating occurs, said heating being taken into consideration when setting the desired heating temperature. The heat propagating in the interior of the inner tank 1 is transmitted to the insulating layer 3 via the wall of the inner tank 1.

Furthermore, negative pressure is generated, for example by way of a vacuum pump, in the insulating layer 3, which initially still contains gas. By means of the reduction in pressure in the insulting layer 3, the latter very rapidly has a thermally insulating effect on the inner tank 1, and therefore the heating process and the evacuation process proceed in an accelerated manner without external heating apparatuses or additional energy for maintaining the temperature of the fuel having to be used.

The evacuation operation can be concluded when a desired absolute pressure of preferably a maximum of $10^{-3}$ mbar is achieved in the insulating layer 3.

The method can be used in a mobile manner. Furthermore, after the end of the evacuation operation, the fuel present in the inner tank 1 can be used as an energy source, for example for the drive force of a vehicle or motor vehicle.

LIST OF REFERENCE NUMBERS

1 Inner tank
2 Outer skin
3 Insulating layer
4 Heat exchanger
5 Filling and removal line
6 Suspension means
10 Tank The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a tank for storing fuel in a low-temperature state, the tank having an inner tank receiving the fuel, an outer skin surrounding the inner tank, and an insulating layer arranged between the inner tank and the outer skin, the method comprising the acts of:
    introducing fuel into the inner tank, a temperature of 30° C. to 120° C. being obtained by the fuel in the inner tank; and
    generating a negative pressure in the insulating layer arranged between the inner tank and the outer skin with a vacuum pump;
    wherein the act of generating the negative pressure or the acts of introducing the fuel and generating the negative pressure are carried out in a vehicle tank arranged on a vehicle.

2. The method according to claim 1, further comprising the act of:
    preheating the fuel before the fuel is introduced into the inner tank in order to obtain the temperature of 30° C. to 120° C.

3. The method according to claim 1, further comprising the act of:
    heating the fuel introduced into the inner tank in the inner tank in order to obtain the temperature of 30° C. to 120° C.

4. The method according to claim 1, wherein the act of generating the negative pressure is carried out to an absolute pressure in the insulating layer of $10^{-3}$ mbar to $10^{-5}$ mbar.

5. The method according to claim 1, wherein a temperature of the fuel introduced into the inner tank upon introduction is between 0° C. to 70° C.

6. The method according to claim 5, wherein the temperature is between 20° C. to 50° C.

7. The method according to claim 1, wherein the temperature being obtained by the fuel in the inner tank is between 70° C. to 85° C.

8. The method according to claim 1, wherein the vacuum pump is a turbomolecular pump.

9. The method according to claim 1, wherein the acts of introducing the fuel and generating the negative pressure are carried out in accordance with a first filling of fuel into the vehicle tank.

10. The method according to claim 9, wherein the vehicle tank is a cryopressure tank configured to receive hydrogen in a supercritical state as the fuel.

11. The method according to claim 1, wherein the vehicle tank is a cryopressure tank configured to receive hydrogen in a supercritical state as the fuel.

* * * * *